US008109364B2

(12) United States Patent
Phillips et al.

(10) Patent No.: US 8,109,364 B2
(45) Date of Patent: Feb. 7, 2012

(54) PORTABLE SELF-CONTAINED FLUID SYSTEM

(75) Inventors: David L. Phillips, Santa Ana, CA (US); Ashfaq Mir, Lake Forest, CA (US); Derrick Thanh Tran, Yorba Linda, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1546 days.

(21) Appl. No.: 11/292,316

(22) Filed: Nov. 30, 2005

(65) Prior Publication Data
US 2007/0119515 A1 May 31, 2007

(51) Int. Cl.
*F16C 3/14* (2006.01)
(52) U.S. Cl. ......................... 184/1.5; 184/6.28
(58) Field of Classification Search .............. 184/6.28, 184/1.5
See application file for complete search history.

(56) References Cited

U.S. PATENT DOCUMENTS

| | | | | | |
|---|---|---|---|---|---|
| 1,892,133 | A | * | 12/1932 | Bijur | 184/28 |
| 2,425,848 | A | * | 8/1947 | Vawter | 210/167.31 |
| 2,477,450 | A | * | 7/1949 | Gray | 184/1.5 |
| 2,684,787 | A | * | 7/1954 | Charpiat | 222/175 |
| 2,767,885 | A | * | 10/1956 | Miller | 222/175 |
| 3,095,123 | A | * | 6/1963 | Smith, Sr. et al. | 222/175 |
| 3,987,869 | A | * | 10/1976 | Bowers | 184/105.1 |
| 4,095,672 | A | * | 6/1978 | Senese | 184/1.5 |
| 4,104,744 | A | | 8/1978 | Odencrantz | |
| 4,280,643 | A | | 7/1981 | Cordova et al. | |
| 4,662,551 | A | * | 5/1987 | Dudley et al. | 224/633 |
| 5,038,892 | A | * | 8/1991 | Maloney | 184/7.4 |
| 5,111,538 | A | | 5/1992 | Chapman | |
| 5,148,785 | A | * | 9/1992 | Sendak | 123/196 R |
| 5,251,345 | A | | 10/1993 | Pechner | |
| 5,595,325 | A | * | 1/1997 | Leres | 222/135 |
| 5,911,520 | A | | 6/1999 | Kenney | |
| 6,022,473 | A | * | 2/2000 | Mickelson | 210/86 |
| 6,059,143 | A | | 5/2000 | Weir | |
| 6,474,443 | B2 | | 11/2002 | Kearns et al. | |
| 6,637,466 | B2 | | 10/2003 | Mills, Jr. | |

(Continued)

FOREIGN PATENT DOCUMENTS
CN 2158979 3/1994

OTHER PUBLICATIONS 1 page English Language Translation CN2158979 Abstract.

*Primary Examiner* — Robert Siconolfi
*Assistant Examiner* — James Hsiao

(57) ABSTRACT

The present invention provides a new and unique portable, self-contained, fluid system. The portable, self-contained, fluid changing system may be used as a fluid changing device for changing a fluid such as oil or another suitable fluid in a container of a boat, recreational vehicle (RV), automobile or other suitable military, agricultural or industrial device. Alternatively, portable, self-contained, fluid system may also be used for providing fluid such as water or other suitable fluid for cleaning or showering. Moreover, the portable, self-contained, fluid system may also have a reversible electric pump that may be adapted or switched for pumping in either direction once the pump is affixed on the reservoir so the system may be sold and marketed for use in a fluid changing type of device or in a water providing or cleaning type of device consistent with that described above.

39 Claims, 3 Drawing Sheets

U.S. PATENT DOCUMENTS

| | | | |
|---|---|---|---|
| 6,655,426 B2 * | 12/2003 | Shevela | 141/382 |
| 6,830,083 B1 | 12/2004 | Hollub et al. | |
| 6,929,036 B2 | 8/2005 | Awad | |
| 7,096,894 B1 * | 8/2006 | Hollub et al. | 141/65 |
| 2004/0035639 A1 * | 2/2004 | Elhadiri | 184/1.5 |
| 2005/0166993 A1 | 8/2005 | Viken et al. | |
| 2006/0096808 A1 * | 5/2006 | Rosenbaum | 184/1.5 |

* cited by examiner

PORTABLE SELF-CONTAINED FLUID SYSTEM

BACKGROUND OF THE INVENTION

1. Technical Field

The present invention relates to a portable, self-contained, fluid system.

2. Description of Related Art

Fluid changing systems are known in the art consisting of a pump and a bucket using a tube to pull oil from an engine. These systems are bulky, top heavy, easy to spill, difficult to empty.

SUMMARY OF THE INVENTION

The present invention provides a new and unique portable, self-contained, fluid system. The portable, self-contained, fluid changing system may be used as a fluid changing device for changing one or more types of fluids such as oil or another suitable fluid in a container of a boat, recreational vehicle (RV), automobile or other suitable military, agricultural or industrial device. Alternatively, portable, self-contained, fluid system may also be used for providing fluid such as water or other suitable fluid for cleaning or showering.

In one embodiment, the portable, self-contained, fluid changing system includes a reservoir having an inlet port for receiving and holding fluid that is being removed from the container of the boat, recreational vehicle (RV), automobile or other suitable military, agricultural or industrial device; in combination with an electric pump affixed to the reservoir, having a pump inlet for receiving and coupling a pump discharge hose thereto that transfers the fluid from the container to the pump, and also having a connecting device for coupling a pump outlet to the input port of the reservoir for transferring the fluid from the pump to the reservoir.

The electric pump may take the form of a suitable positive displacement pump, such as a self-priming, dry run pump, a diaphragm pump, a flexible impeller pump (FIP), a rotary vain pump, a rotary gear pump, etc. having an on/off switch to make the pumping process easy. The electric pump may be powered by a suitable power source, such as a 12-24 volt car battery or the like, and may include a switch for turning the pump on/off. The pump may also have leads with clamps for coupling to a power source. The electric pump may also have an automatic turn on/off device.

The reservoir has a one-piece molded plastic construction with one or more molded-in inserts for quickly and easily mounting the pump on the reservoir using pan head screw and a mounting arrangement for easy assembly. The reservoir may also have a recessed cavity for holding the pump and protecting the same. The reservoir may also include a venting port for venting air when the fluid is filling the reservoir, as well as a pour spout for quickly and easily discharging the fluid from the reservoir and a cap for covering and sealing the same. The reservoir has a capacity of about 3.5 gallons (14 quarts) providing a compact design for easy handling and storage. The reservoir may include a handle for carrying the same The portable, self-contained, fluid changing system may also include a vent strap affixed to the reservoir for receiving and holding the pump discharge hose when the system is not being used. The vent strap couples to a reservoir vent and closes the same.

The connecting device is a plug in elbow for coupling to a grommet in the inlet port of the reservoir for easy assembly.

The pump discharge hose may be dimensioned for easily fitting down a standard dip stick orifice in the boat, recreational vehicle (RV), automobile or other suitable industrial use.

In a preferred embodiment, the system or unit according to the present invention may consist of a closed container with molded-in inserts for pump mounts, the pump unit, and a grommet to allow the pump discharge hose to fill into the container while sealing the unit. By utilizing a sealed container with a vent strap/hose holder combination, there is little likelihood of spillage if the fluid tight lid is put on correctly. The design and mounting of the pump makes the unit balanced and easy to use and carry. The unit has multiple changing applications with the possible exception of gasoline in industrial, marine, RV, military and commercial areas.

In an alternative embodiment, the portable, self-contained, fluid system may also include using such the reservoir for providing fluid such as water or other suitable fluids for cleaning. In this case, the reservoir holds the fluid and has an outlet port for transferring the fluid from the reservoir. The electric pump affixed to the reservoir uses the connecting device for coupling a pump inlet to the outlet port of the reservoir for transferring the fluid from the reservoir to the pump, and uses a pump outlet for coupling a pump discharge hose thereto to provide the fluid from the pump. This embodiment may include one or more features of the aforementioned fluid changing system so as to provide a portable and inexpensive fluid system that has unlimited applications where clean water is needed. For example, in a preferred embodiment the portable clean water system may consist of a tank, a small pump, a wire harness and spray nozzle attached to a coil hose. The small pump may be connected to a DC power source which provides clean water from the tank through the spraying nozzle. The portable water clean system can be used for boat, RV, ATV, truck, etc. applications. The portable water clean system will enhance the pleasure of the small boater who has a need to wash things and give, for example, their children a shower after a day of swimming or playing. Farm and constructions workers can wash themselves down in the middle of the field where no fresh water is available. Tailgaters and picnickers can use the system for entertaining purposes as well.

Embodiments are also envisioned in which the present invention may take the form of a portable, self-contained, fluid system having a suitable reversible positive displacement pump that may be adapted or switched for pumping in either direction once the pump is affixed on the reservoir so the system may be sold and marketed for use in a fluid changing type of device or in a water providing or cleaning type of device consistent with that described above.

BEST MODE FOR CARRYING OUT THE INVENTION

Figure 1:
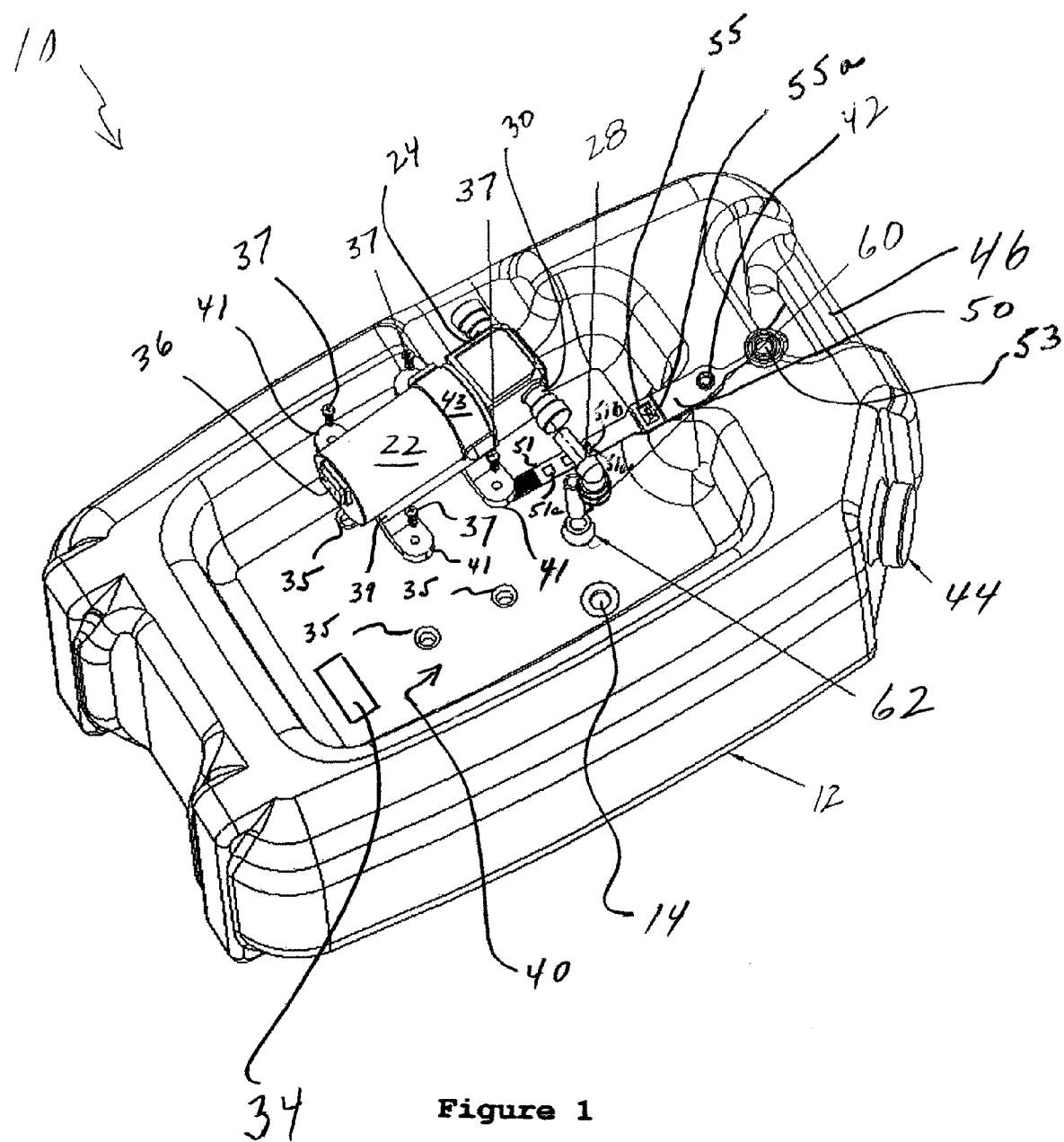
FIGS. 1 and 2 are diagrams of a portable, self-contained, fluid system according to the present invention.

The present invention provides a new and unique portable, self-contained, fluid system generally indicated as 10 as shown in FIGS. 1-5 according to the present invention.

The portable, self-contained, fluid changing system 10 includes a reservoir 12 having an inlet port 14 for receiving and holding fluid (not shown) that is being removed from a container 16 (see FIG. 3a) of a device 18 (see FIG. 3a) in a boat, recreational vehicle (RV), automobile or other suitable military, agricultural or industrial device; and an electric pump 22 affixed to the reservoir 12, having a pump inlet 24 for receiving and coupling a pump discharge hose 26 (see FIG. 2) thereto that transfers the fluid from the container to the pump 22, and also having a connecting device 28 for coupling a pump outlet 30 to the input port 14 of the reservoir 12 for transferring the fluid from the pump 22 into the reservoir 12.

Figure 4:
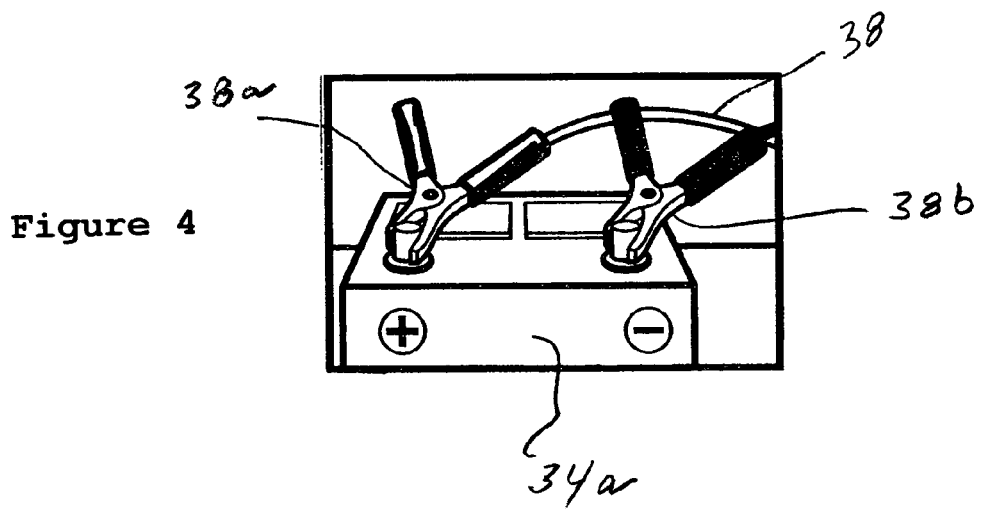
FIG. 4 is a diagram of battery leads being coupled to a typical 12 or 24 voltage supply of a boat, car, RV, etc.
Figure 5:
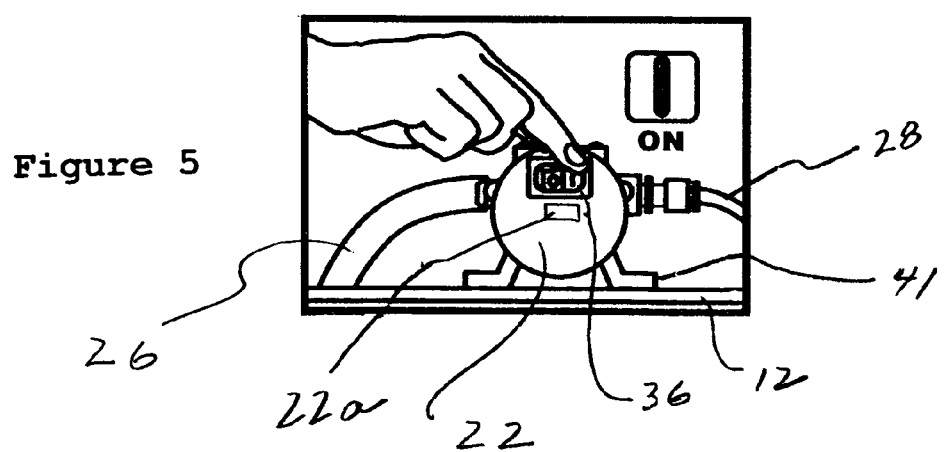
FIG. 5 is a diagram of a suitable pump having an on/off switch according to the present invention.

The electric pump 22 may take the form a positive displacement pump, such as a self-priming, dry run pump, a diaphragm pump, a flexible impeller pump (FIP), rotary vain pump, rotary gear pump, etc. The electrical pump 22 may be uni-directional or reversible for pumping in either direction based on the setting, for example, of a switch 22a (see FIG. 5) or other suitable direction setting mechanism. Moreover, the scope of the invention is not intended to be limited to any particular type or kind of pump, and is intended to include other types or kinds of pumps either now known or later developed in the future. The electric pump 22 may be powered by a suitable power source 34, which may be a rechargeable batter 34 affixed directly to the reservoir 12 as shown in FIG. 1, or which may include a 12-24 volt stand-alone battery 34a as shown in FIG. 4, or some other suitable power source or battery. The scope of the invention is not intended to be limited to any particular type or kind of power source or battery for powering the pump 22, and is intended to include other types or kinds of power sources or batteries either now known or later developed in the future. The pump 22 may also include a switch 36 for turning the pump on/off to make the pumping process easy. The pump 22 may also have battery leads 38 with clamps 38a, 38b for coupling to the power source such as battery 34.

The reservoir 12 has a one-piece molded plastic construction with one or more molded-in inserts 35 for quickly and easily mounting the pump 22 on the reservoir 12 using a mounting arrangement such as pan head screws 37, a mounting bracket 39, mounting members 41 and one or more mounting straps 43 for quick and easy assembly. The scope of the invention is intended to include using other types or kinds of mounting arrangements either now known or later developed in the future. The connecting device 28 may take the form of a plug-in elbow for coupling to a piece of tubing 60 and a grommet 62 to couple the plug-in elbow 28 to the inlet port 14 of the reservoir 12. Embodiments are also envisioned in which the plug-in elbow 28, the tubing 60 and the grommet 62 form one integral piece.

The reservoir 12 also has a recessed cavity generally indicated 40 for receiving the pump 22 and protecting the same. The reservoir 12 may also include a venting port 42 for venting air when the fluid is filling the reservoir 12, as well as a pour spout 44 for quickly and easily discharging the fluid from the reservoir and a cap 45 (FIG. 2) for covering and sealing the same. The cap 45 may also be removed for providing additional venting. The reservoir 12 has a capacity of about 3.5 gallons (14 quarts) providing a compact design for easy handling and storage. The scope of the invention is not intended to be limited to any particular portable size for the reservoir 12, and is intended to include other sizes such as 2 gallons, 3 gallons, 4 gallons, etc. The reservoir 12 may also include a handle 46 for carrying the same.

Figure 2:
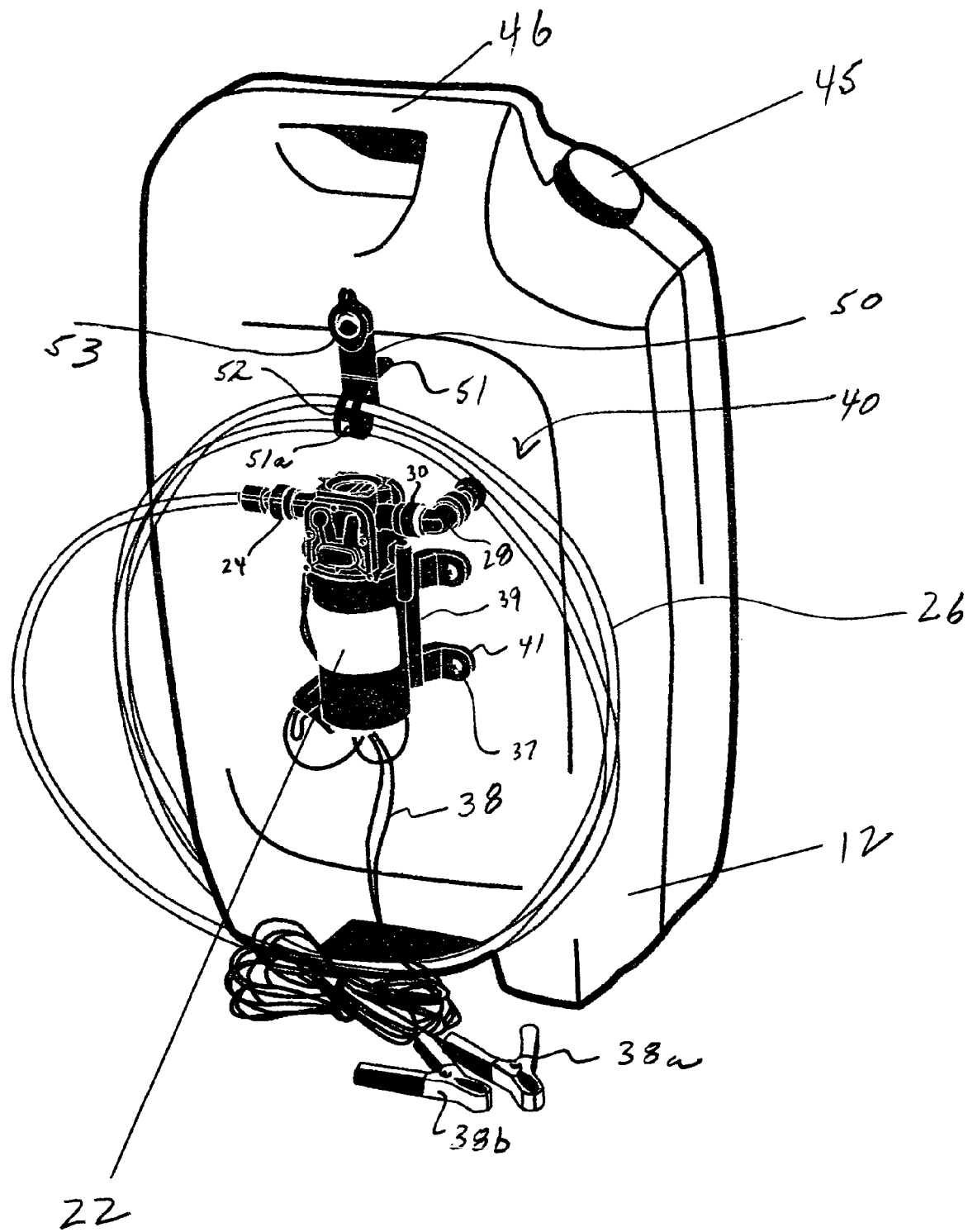
Figures 3A, 3B:
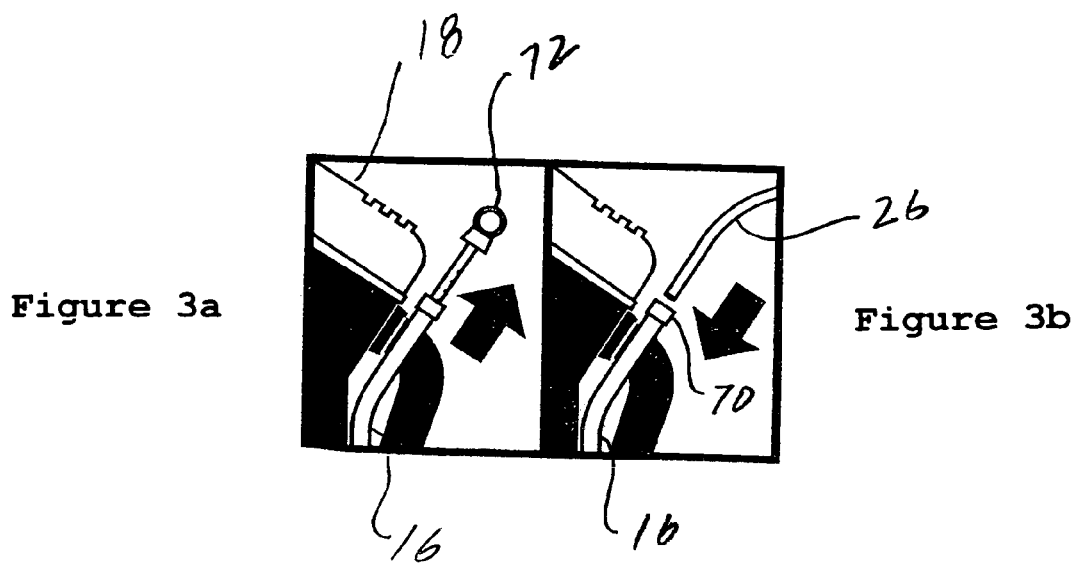
FIGS. 3a and 3b are diagrams of the steps for providing a discharge hose of the portable, self-contained, fluid system according to the present invention into a dipstick orifice.

The portable, self-contained, fluid changing system 12 may also include a vent strap 50 affixed to the reservoir 12 for receiving and holding the pump discharge hose 26 when the system 10 is not being used. The vent strap 50 couples to the reservoir vent 42, has a loop piece 51 with openings 51a for forming a loop 52 and holding the pump discharge hose 26 and/or wiring 38, as shown in FIG. 2, and has a cap 53 (FIG. 2) for closing the same. In FIG. 1, the reservoir port 42 is shown uncovered; and in FIG. 2 the reservoir port 42 is shown having the cap 53 arranged thereon for closing the same.

As shown in FIG. 1, the vent strap 50 is configured with an opening 55 having a tab 55a. As shown in FIGS. 1 and 2, the loop piece 51 is configured to form the loop 52 for holding the pump discharge hose 26 and/or wiring 38 by passing an end of the loop piece 51 through the opening 55. A rim 51b of one opening 51a of the loop piece 51 may engage the tab 55a for holding the loop piece 51 in the opening 55 to form the loop 52.

The pump discharge hose 26 may be dimensioned for easily fitting down a standard orifice 70 for a dip stick 72 in the boat, recreational vehicle (RV), automobile or other suitable industrial use.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein without departing from the spirit and scope of the present invention.

The invention claimed is:

1. A portable, self-contained, fluid changing system with a reservoir for changing a fluid such as oil or another suitable fluid in a container of a boat, recreational vehicle (RV), automobile or other suitable military, agricultural or industrial device, comprising:
   a reservoir having an inlet port for receiving and holding the fluid that is being removed from the fluid container, the reservoir being configured as a one-piece molded plastic construction with a recessed cavity having a recessed surface with one or more molded-in inserts; and
   an electric pump having a mounting arrangement with one or more mounting members having a mounting bracket configured to couple to the one or more molded-in inserts of the recessed surface of the one-piece molded plastic construction to mount securely the electric pump to the recessed surface in the recessed cavity of the reservoir so as to hold and protect the electric pump, having a pump inlet for receiving and coupling a pump discharge hose thereto that transfers the fluid from the container to the pump, and also having a connecting device for coupling a pump outlet to the input port of the reservoir for transferring the fluid from the pump to the reservoir.

2. A portable, self-contained, fluid changing system according to claim 1, wherein the electric pump is a positive displacement pump, such as a self-priming, dry run pump, a diaphragm pump, a flexible impeller pump (FIP), rotary vain pump, or rotary gear pump.

3. A portable, self-contained, fluid changing system according to claim 1, wherein the electric pump is a positive displacement pump, having an on/off switch to make the pumping process easy.

4. A portable, self-contained, fluid changing system according to claim 1, wherein the electric pump is powered by a suitable power source.

5. A portable, self-contained, fluid changing system according to claim 1, wherein the electric pump is powered by a suitable battery such as a 12-24 volt battery.

6. A portable, self-contained, fluid changing system according to claim 1, wherein the electric pump is powered by a rechargeable battery affixed to the reservoir.

7. A portable, self-contained, fluid changing system according to claim 1, wherein the electric pump has leads with one or more clamps for coupling to a power source.

8. A portable, self-contained, fluid changing system according to claim 1, wherein the electric pump has an automatic turn on/off device.

9. A portable, self-contained, fluid changing system according to claim 1, wherein the reservoir has a one-piece molded plastic construction.

10. A portable, self-contained, fluid changing system according to claim 1, wherein the reservoir has a venting port for venting air when the fluid is filling the reservoir.

11. A portable, self-contained, fluid changing system according to claim 1, wherein the reservoir has a pour spout for quickly and easily discharging the fluid from the reservoir and a cap for covering and sealing the reservoir.

12. A portable, self-contained, fluid changing system according to claim 1, wherein the reservoir has a handle for carrying the reservoir.

13. A portable, self-contained, fluid changing system according to claim 1, wherein the pump discharge hose is dimensioned for fitting down a standard orifice for a dip stick used in the boat, recreational vehicle (RV), automobile or other suitable military, agricultural or industrial use.

14. A portable, self-contained, fluid changing system according to claim 1, wherein the portable, self-contained, fluid changing system has a multi-purpose vent strap affixed to the recessed surface of the reservoir and coupled to the reservoir vent, having one end with a cap configured for covering the reservoir vent, and having another end with a loop piece configured to form a loop for receiving and holding the pump discharge hose and/or wiring when the system is not being used.

15. A portable, self-contained, fluid changing system according to claim 1, wherein the connecting device is a plug-in elbow for coupling to a grommet in the inlet port of the reservoir for easy assembly.

16. A portable, self-contained, fluid system with a reservoir for providing fluid such as water or other suitable fluid for cleaning, comprising:
a reservoir for holding the fluid, having an outlet port for transferring the fluid from the reservoir, and having a reservoir vent, the reservoir being configured as a one-piece molded plastic construction with a recessed cavity having a recessed surface with one or more molded-in inserts;
a multi-purpose vent strap affixed to the recessed surface of the reservoir and coupled to the reservoir vent, having one end with a cap configured for covering the reservoir vent, and also having another end with a loop piece configured to form a loop for receiving and holding a pump discharge hose, or wiring, or both, when the portable, self-contained, fluid system is not being used; and
an electric pump having a mounting arrangement with one or more mounting members having a mounting bracket configured to couple to the one or more molded-in inserts of the recessed surface of the one-piece molded plastic construction to mount securely the electric pump to the recessed surface in the recessed cavity of the reservoir so as to hold and protect the electric pump, having a connecting device for coupling a pump inlet to the outlet port of the reservoir for transferring the fluid from the reservoir to the pump, and having a pump outlet for coupling a pump discharge hose thereto to provide the fluid from the pump.

17. A portable, self-contained, fluid system according to claim 16, wherein the electric pump is a positive displacement pump, such as a self-priming, dry run pump, a diaphragm pump, a flexible impeller pump (FIP), rotary vain pump, or rotary gear pump.

18. A portable, self-contained, fluid system according to claim 16, wherein the electric pump is a positive displacement pump, having an on/off switch to make the pumping process easy.

19. A portable, self-contained, fluid system according to claim 16, wherein the electric pump is powered by a suitable power supply.

20. A portable, self-contained, fluid system according to claim 16, wherein the electric pump is powered by a suitable battery such as a 12-24 volt battery.

21. A portable, self-contained, fluid system according to claim 16, wherein the electric pump is powered by a rechargeable battery affixed to the reservoir.

22. A portable, self-contained, fluid system according to claim 16, wherein the pump has leads with one or more clamps for coupling to a power source.

23. A portable, self-contained, fluid system according to claim 16, wherein the electric pump has an automatic turn on/off device.

24. A portable, self-contained, fluid system according to claim 16, wherein the reservoir has a venting port for venting air when the fluid is filling the reservoir.

25. A portable, self-contained, fluid system according to claim 16, wherein the reservoir has a pour spout for quickly and easily filling or discharging the fluid to or from the reservoir and a cap for covering and sealing the reservoir.

26. A portable, self-contained, fluid system according to claim 16, wherein the mounting arrangement further comprises a mounting bracket, one or more mounting straps or the combination thereof for quick and easy assembly.

27. A portable, self-contained, fluid system according to claim 16, wherein the reservoir has a recessed cavity for holding and protecting the pump.

28. A portable, self-contained, fluid changing system according to claim 16, wherein the reservoir has a handle for carrying the reservoir.

29. A portable, self-contained, fluid system according to claim 16, wherein the pump discharge hose is dimensioned for receiving a spraying nozzle on its end.

30. A portable, self-contained, fluid system according to claim 16, wherein the multi-purpose vent strap is configured with a cap piece to couple to and close the reservoir vent, and is also configured with a loop piece configured with openings for forming a loop to hold the pump discharge hose, or the wiring, or both.

31. A portable, self-contained, fluid system according to claim 30, wherein the vent strap couples to a reservoir vent and has a cap for closing the reservoir.

32. A portable, self-contained, fluid system according to claim 16, wherein the connecting device is a plug-in elbow for coupling to a grommet in the inlet port of the reservoir for easy assembly.

33. A portable, self-contained, fluid system, comprising:
a reservoir having an inlet port for receiving a fluid that is being removed from another container when the portable, self-contained, fluid system is adapted for use as a fluid changing type of device, being configured as a one-piece molded plastic construction with a recessed cavity having a recessed surface with one or more molded-in inserts, and having an outlet port for transferring water or other suitable cleaning fluid from the reservoir when the portable, self-contained, fluid system is adapted for use as a water providing or cleaning type of device; and a reversible electric pump including a mounting arrangement having a mounting bracket with one or more mounting members configured to couple to the one or more molded-in inserts of the recessed surface of the one-piece molded plastic construction to mount securely the electric pump to the recessed surface in the recessed cavity of the reservoir so as to hold and protect the electric pump, having a pump inlet for receiving and coupling a pump discharge hose thereto that transfers the fluid from the container to the pump and also having a connecting device for coupling a pump outlet to the input port of the reservoir for transferring the fluid from the pump to the reservoir when the portable, self-contained, fluid system is adapted for use as the fluid changing type of device; the connecting device for coupling a pump inlet to the outlet port of the reservoir for transferring the water or the other suitable cleaning fluid from the reservoir to the pump, and having a pump outlet for coupling a pump discharge hose thereto to provide the water or the other suitable cleaning fluid from the pump when the portable, self-contained, fluid system is adapted for use in a water providing or cleaning type of device, the reversible electric pump being adapted for pumping in either direction once the pump is affixed on the reservoir so the system may be sold and marketed for use as either the fluid changing type of application or water providing or cleaning type of device.

34. A portable, self-contained, fluid changing system according to claim 14, wherein the vent strap is configured with an opening having a tab, and the vent strap has a loop piece configured to form in a loop for holding the pump discharge hose and/or wiring by passing an end of the loop piece through the opening.

35. A portable, self-contained, fluid changing system according to claim 34, wherein a rim of one opening of the loop piece is configured to engage the tab for holding the loop piece in the opening to form the loop.

36. A portable, self-contained, fluid changing system according to claim 16, wherein the vent strap is configured with an opening having a tab, and the vent strap has a loop piece configured to form a loop for holding the pump discharge hose and/or wiring by passing an end of the loop piece through the opening.

37. A portable, self-contained, fluid changing system according to claim 36, wherein a rim of one opening of the loop piece is configured to engage the tab for holding the loop piece in the opening to form the loop.

38. A portable, self-contained, fluid changing system according to claim 33, wherein the vent strap is configured with an opening having a tab, and the vent strap has a loop piece configured to form a loop for holding the pump discharge hose and/or wiring by passing an end of the loop piece through the opening.

39. A portable, self-contained, fluid changing system according to claim 38, wherein a rim of one opening of the loop piece is configured to engage the tab for holding the loop piece in the opening to form the loop.

* * * * *